Patented Oct. 26, 1943

2,332,834

UNITED STATES PATENT OFFICE 2,332,834

PROCESS FOR THE PREPARATION OF HIGHER UNSATURATED ALIPHATIC ALCOHOLS

Gustav von Schuckmann, Uerdingen, Niederrhein, Germany, assignor to American Hyalsol Corporation, Wilmington, Del.

No Drawing. Application June 22, 1940, Serial No. 341,905. In Germany March 16, 1936

11 Claims. (Cl. 260—638)

This invention relates to the preparation of higher molecular unsaturated aliphatic alcohols and more particularly to their production by catalytic reduction of the corresponding higher molecular unsaturated fatty acids.

It is known to the prior art that by hydrogenating fatty materials of the nature of unsaturated fatty acids (including their anhydides) or their esters in the presence of hydrogen and hydrogenation catalysts at higher temperatures, and, if desirable, raised pressure, one may saturate double bonds by the introduction of hydrogen. This process is frequently referred to as "fat hardening." It is also known that by using higher atmospheric pressures and/or temperatures and preferably making use of certain finely divided or activated hydrogenation catalysts, one may not only add hydrogen to the carbon chain at the double bond but may also simultaneously reduce the carboxylic group to the primary alcohol group. In accordance with this last process, unsaturated fatty acids are directly converted to the saturated primary aliphatic alcohols containing the same number of carbon atoms. One cannot, however, obtain unsaturated alcohols in this manner.

Furthermore, it is also known that in order to reduce the carboxylic group of unsaturated fatty acids, one may add small amounts of sulfur, phosphorous, cyanide or arsenic compounds to certain catalysts. By this means, the catalysts are influenced in such manner that the addition of the hydrogen to the carbon atom containing the double bond is retarded. One can obtain a similar effect by the use of carbon monoxide, and in accordance with this procedure, one can obtain a portion of the final product in the form of an unsaturated compound and therefore obtain a mixture of the two which predominantly consists of waxy partially unsaturated esters. This process has, however, certain disadvantages in view of the fact that foreign matter is added to the reaction mixture which under certain circumstances may have a detrimental effect. Besides which, in accordance with this procedure, it is not possible to obtain products consisting wholly or predominantly of alcohols. One obtains, rather, esters for the most part, inasmuch as these agents also strongly effect the reduction of the ester group.

In accordance with the instant invention, it has been found that by means of a mixed catalyst containing copper and 15-55% cadmium (calculated on the amount of copper) preferably precipitated upon a carrier, it is possible to reduce the carboxylic group of unsaturated fatty acids and their derivatives containing at least 8 carbon atoms in the carboxylic group almost entirely into the corresponding unsaturated fatty alcohols. Kieselguhr, asbestos, pumice stone powder, particularly beechwood charcoal and animal charcoal, and the like, are examples of the carrier for the catalyst which we have found to be suitable.

Suitable raw fatty materials are oleic acid, undecylenic acid, erucic acid, linoleic acid, technical fatty acids from non-drying or drying oils, such as olive oil, soy bean oil, cottonseed oil, beet oil, linseed oil, wood oil, train oil, sperm oil, and the like, as well as their ester derivatives, such as the alkyl esters and glycerine esters themselves.

Following the procedure of the invention, the fatty materials are mixed in known manner with about 5–20% of the above described catalyst in an autoclave and treated with hydrogen under an elevated pressure and a high temperature, which conditions need not differ from those known to the prior art. The complete course of the reaction in a preferred embodiment is effected by carrying out the initial reduction of the catalysts in the presence of the unsaturated acids to be reduced by subjecting the same to a hydrogen pressure below 30 atmospheres, preferably at about 10–30 atmospheres, and a temperature of 100–200° C. and then by continuing the hydrogenation process by heating the mixture to a temperature of 280° C. with an increase in hydrogen pressure up preferably to 200 atmospheres or at least to a pressure sufficient to accomplish the reduction of the carboxylic group. By carrying out the reduction of the cadmium containing copper catalyst at a low pressure in the presence of the acid to be reduced the catalyst is selectively influenced so that in the desired direction the effectiveness of the catalyst toward the reduction of the carboxylic group is increased, whereas at the same time the effectiveness for the reduction of the ethylene bond is decreased.

This effect can be more strongly obtained if the water vapor produced during the period of heating is removed from the reaction chamber before additional hydrogen is added. This drying operation can be effected by circulating the hydrogen contained in the autoclave through a drying means or by removing the water vapor by drawing off the hydrogen contained in the reaction chamber immediately after the heating period and then immediately adding dry hydrogen to obtain the desired pressure. The highest degree of activity and selectivity of the catalyst is obtained when the reaction is carried out in a copper-cadmium plated autoclave. Due to the influence of the copper-cadmium layer existing on the wall of the autoclave, the reaction time is very much shortened. The plating of the autoclave may be carried out in the simplest manner in a carefully degreased and cleaned autoclave consisting of chromium-nickel steel fast to corrosion in which 5 or 6 reductions of the unsaturated fatty acids in the above noted manner have been carried out with copper-cadmium catalysts.

The products obtained by the practice of the present invention are for the most part technically pure unsaturated fatty alcohols. If so desired, the resulting products can be freed from fatty acids, fatty acid esters and saturated alcohols by treating them with saponifying agents and distilling off the unsaponified portion.

The following examples illustrate how the process can be carried out most advantageously.

*Example 1*

Forty-one parts by weight of technical copper sulfate and 9 parts by weight of cadmium nitrate are simultaneously dissolved in 200 parts by weight of water and reacted with a slight excess of a 15% solution of soda. Thereupon, one stirs into the mixture 15 parts by weight of kieselguhr, filters off the precipitate and rapidly takes it up in water, heats the solution to its boiling point, filters it, rapidly takes up the precipitate three or four times in water and washes it until it is free of sulfate. The precipitate is then dried at a temperature of 130° C.

Twenty parts by weight of oleic acid and 2 parts by weight of a catalyst are introduced into the autoclave whereupon hydrogen is added until a pressure of 130 atmospheres is reached. One then heats this mixture to 280° C. within a period of about 30 minutes, keeping the temperature at this degree for a period of five minutes and then allows the same to cool. The index numbers of these products are as follows:

Acid number_____ 23.7
Ester number_____ 53.1
Hydroxyl number_____ 87.9
Iodine number_____ 86.3

For comparative purposes the index numbers of a product obtained in the customary manner with a cadmium-free copper kieselguhr catalyst under the same reaction conditions is given below.

Acid number_____ 62.9
Ester number_____ 66.8
Hydroxyl number_____ 15
Iodine number_____ 28.5

*Example 2*

Twenty parts by weight of oleic acid and two parts by weight of the catalyst described in Example 1 was introduced into an autoclave and then subjected to hydrogen at a pressure of 20 atmospheres. The temperature of this material is then raised to 280° C. within a period of 30 minutes, whereupon additional hydrogen is added until the pressure reaches 240 atmospheres. One then keeps this material at a temperature of 280° C. for a period of five minutes and then allows the same to cool. The index numbers of the products are as follows:

Acid number_____ 12.2
Ester number_____ 40.7
Hydroxyl number_____ 123.3
Iodine number_____ 80.8

*Example 3*

One proceeds in accordance with Example 2 but varies the process by increasing the heating period to 36 minutes instead of the 30 minutes given above and increases the temperature to 300° C. in place of the 280° C. given above. One holds the temperature for a period of five minutes and then allows the mass to cool. The index numbers of the products are as follows:

Acid number_____ 6
Ester number_____ 24.3
Hydroxyl number_____ 154
Iodine number_____ 63.5

From a study of the ester and hydroxyl number in this and preceding example, it is readily seen that the carboxylic radical is reduced to the corresponding alcohol regardless of whether the carboxylic group is an acid or an ester.

*Example 4*

Twenty parts by weight of oleic acid and 2 parts by weight of the catalyst prepared in accordance with Example 1 are introduced into an autoclave and then subjected to a hydrogen pressure of 20 atmospheres; whereupon the reaction mixture is heated to a temperature of 280° C. within 30 minutes; whereupon the water-vapor-containing hydrogen is removed from the reaction chamber and immediately replaced with dry hydrogen, the pressure also being raised to 240 atmospheres. This mixture is then kept at a temperature of 280° C. for a period of 15 minutes whereupon it is allowed to cool. The index numbers of the products are as follows:

|  | Charge 1 | Charge 2 |
|---|---|---|
| Acid number | 0 | 0 |
| Ester number | 20.5 | 12.9 |
| Hydroxyl number | 182.4 | 185.1 |
| Iodine number | 68.2 | 58.9 |

*Example 5*

The procedure is carried out in accordance with Example 4, however, the 15 minutes period is changed to 20 minutes. The index numbers of the products are as follows:

Acid number_____ 0
Ester number_____ 5.6
Hydroxyl number_____ 200.2
Iodine number_____ 54.0

A study of the ester numbers and the hydroxyl numbers in this example and in Example 4 makes it clear that the carboxylic group of the fatty acid esters is reduced to the corresponding alcohol.

*Example 6*

Twenty parts by weight of oleic acid and 2 parts by weight of the catalyst prepared in accordance with Example 1 are introduced into the copper-cadmium plated autoclave and subjected to a hydrogen pressure of 130 atmospheres; whereupon the mixture is heated to a temperature of 280° C. within 30 minutes and then hydrogenated at this temperature from 3-5 minutes. The index numbers of these products are as follows:

Acid number_____ 0
Ester number_____ 6.8
Hydroxyl number_____ 194.2
Iodine number_____ 69.5

Example 7

One proceeds in the same manner as described in Example 6 but replaces the oleic acid named therein by whale oil fatty acid. The index numbers of these products are as follows:

| | |
|---|---|
| Acid number | 0 |
| Ester number | 9.8 |
| Hydroxyl number | 182.2 |
| Iodine number | 77.4 |

Example 8

One proceeds in the same manner as described in Example 6 but replaces the oleic acid named therein by sperm oil fatty acid. The index numbers of these products are as follows:

| | |
|---|---|
| Acid number | 0 |
| Ester number | 8.7 |
| Hydroxyl number | 188.5 |
| Iodine number | 66.7 |

Example 9

Twenty parts by weight of sperm oil and 2 parts by weight of the catalyst prepared in accordance with Example 1 are introduced into an autoclave, whereupon hydrogen is added until a pressure of 130 atmospheres is reached. The mass is then heated to and maintained at a temperature of about 340° C. for a period of three hours. The mass is then permitted to cool. As a result of the reduction of the fatty acid content, sperm oil alcohols are found in the reaction product.

Example 10

Twenty parts by weight of cotton-seed oil and 2 parts by weight of the catalyst described in Example 1 are introduced into an autoclave and then subjected to a pressure of 240 atmospheres during heating to a temperature of 340° C. After about three hours the mass is permitted to cool. Higher molecular unsaturated alcohols corresponding to the fatty acids in the cotton-seed oil are found in the reaction mass.

This application is a continuation-in-part of applicant's pending application Serial No. 131,011, filed March 15, 1937.

It should be understood that the instant invention is not limited to the specific compounds or reaction conditions herein disclosed, but that it extends to all equivalent compounds and variations which will occur to those skilled in the art upon consideration of the scope of the claims appended hereto.

I claim:

1. A carrier supported hydrogenation catalyst for reducing unsaturated fatty acids to unsaturated alcohols essentially containing copper and cadminum, the latter being present in the ratio of 15 to 55% of the former.

2. The process of preparing aliphatic unsaturated alcohols which comprises reducing higher molecular aliphatic acids containing at least 8 carbon atoms with the aid of a mixed catalyst essentially containing copper and cadmium precipitated upon a carrier, the cadmium being present in the proportion of 15 to 55% of the copper; the reduction of the precipitated catalyst being first accomplished in the presence of said acids at a hydrogenation pressure of not more than 30 atmospheres while heating at a temperature between about 100° C. to about 200° C., removing the water formed during the reduction of the catalyst, and continuing the reduction process at higher temperatures and pressures known to effect catalytic reduction of higher molecular fatty acids to alcohols until said alcohols are obtained from said acids.

3. The process described in claim 2 wherein the pressure during the latter stages of the reduction process is about 200 to about 500 atmospheres.

4. The process described in claim 2 wherein the temperature during the final stages of the reduction process is about 280° C.

5. The process described in claim 2 wherein the final stages of the reduction process takes place in the presence of substantially dry hydrogen.

6. In the process of preparing unsaturated aliphatic alcohols from unsaturated fatty acids containing at least 8 carbon atoms, the steps which comprise precipitating a mixed catalyst consisting essentially of copper and cadmium upon a carrier, the cadmium being present in the proportion of 15 to 55% of the copper, admixing said precipitated catalyst with said unsaturated fatty acid, subjecting the resulting mixture to hydrogenation at a pressure below 30 atmospheres and at a temperature of about 100° to about 200° C., and subsequently continuing the hydrogenation at a pressure in excess of 200 atmospheres and at a temperature of about 280° C. whereby unsaturated alcohols are obtained.

7. In the catalytic reduction of higher molecular unsaturated aliphatic acids to the corresponding alcohols at elevated temperatures and pressures in the presence of hydrogen, the improvement comprising effecting said reduction with a hydrogenation catalyst essentially containing copper and from 15 to 55% cadmium based on the copper content.

8. The process of preparing higher aliphatic unsaturated alcohols which comprises subjecting higher unsaturated aliphatic acids containing at least 8 carbon atoms to the action of a mixed catalyst essentially containing copper and cadmium precipitated upon a carrier, the cadmium being contained in the proportion of 15 to 55% of the copper in the presence of hydrogen at an elevated temperature and pressure known to effect catalytic reduction of higher molecular fatty acids to alcohols under which conditions unsaturated aliphatic alcohols are obtained.

9. The process as described in claim 8 wherein the catalyst employed is one which has been reduced at a hydrogenation pressure of not more than 30 atmospheres at a temperature between about 100° C. and about 200° C.

10. The process as described in claim 7 wherein the reduction process is carried out in an autoclave plated with a copper-cadmium mixture.

11. The process described in claim 7 wherein the final stages of the reduction process takes place in the presence of substantially dry hydrogen.

GUSTAV von SCHUCKMANN.